(12) United States Patent
Shamouilian et al.

(10) Patent No.: US 6,639,783 B1
(45) Date of Patent: *Oct. 28, 2003

(54) MULTI-LAYER CERAMIC ELECTROSTATIC CHUCK WITH INTEGRATED CHANNEL

(75) Inventors: Shamouil Shamouilian, San Jose, CA (US); You Wang, Cupertino, CA (US); Ananda H. Kumar, Milpitas, CA (US)

(73) Assignee: Applied Materials, Inc., Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/149,807

(22) Filed: Sep. 8, 1998

(51) Int. Cl.⁷ ............................................... H02N 13/00
(52) U.S. Cl. ....................................... 361/234; 279/128
(58) Field of Search ............................ 361/234; 269/8; 204/298.15; 279/128; 156/345; 318/728, 733

(56) References Cited

U.S. PATENT DOCUMENTS

| | | | |
|---|---|---|---|
| 4,565,601 A | * 1/1986 | Kakehi et al. ................. 216/59 |
| 4,603,466 A | 8/1986 | Morley ..................... 29/569 R |
| 4,963,713 A | 10/1990 | Horiuchi et al. ........ 219/121.43 |
| 5,238,499 A | 8/1993 | van de Ven et al. ......... 118/724 |
| 5,382,311 A | 1/1995 | Ishikawa et al. ............. 156/345 |
| 5,474,614 A | * 12/1995 | Robbins ...................... 118/728 |
| 5,522,131 A | * 6/1996 | Steger .......................... 29/829 |
| 5,535,507 A | * 7/1996 | Barnes et al. ................. 29/825 |
| 5,556,521 A | * 9/1996 | Ghanbari ............... 204/192.32 |
| 5,581,874 A | * 12/1996 | Aoki et al. ..................... 29/825 |
| 5,583,737 A | * 12/1996 | Collins et al. ............... 361/234 |
| 5,589,002 A | 12/1996 | Su .......................... 118/723 E |
| 5,715,132 A | 2/1998 | Steger et al. ................ 361/234 |
| 5,745,331 A | * 4/1998 | Shamouilian et al. ....... 361/234 |
| 5,748,435 A | 5/1998 | Parkhe ........................ 361/234 |
| 5,766,365 A | * 6/1998 | Umotoy et al. ............. 118/728 |
| 5,880,924 A | * 3/1999 | Kumar et al. ................ 361/234 |

* cited by examiner

*Primary Examiner*—Kim Huynh
(74) *Attorney, Agent, or Firm*—Moser Patterson & Sheridan; Joseph Bach

(57) ABSTRACT

A semiconductor wafer support chuck having small diameter gas distribution ports for heat transfer gas. The diameter ports inhibit plasma ignition in heat transfer gas distribution channels. The ports are less than 20 mils in diameter less than 3 mm in length. The short length of the ports facilitates fabrication of multiple ports of very small diameter. The ports communicate with a gas distribution plenum integrated into the body of the chuck beneath a wafer support surface. The plenum has radial channels and a peripheral groove for distributing heat transfer gas to the wafer support surface.

19 Claims, 4 Drawing Sheets

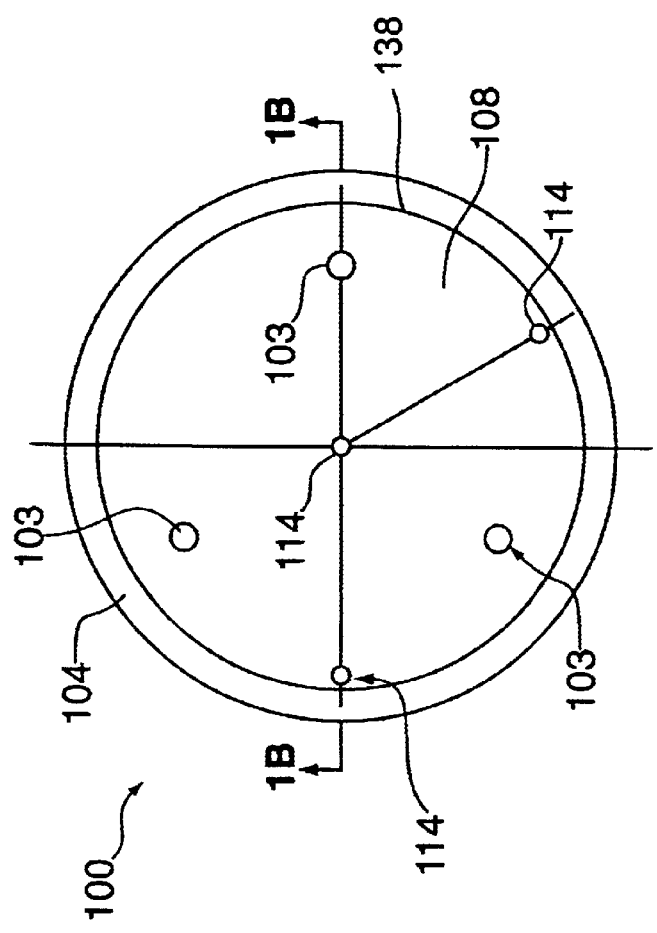
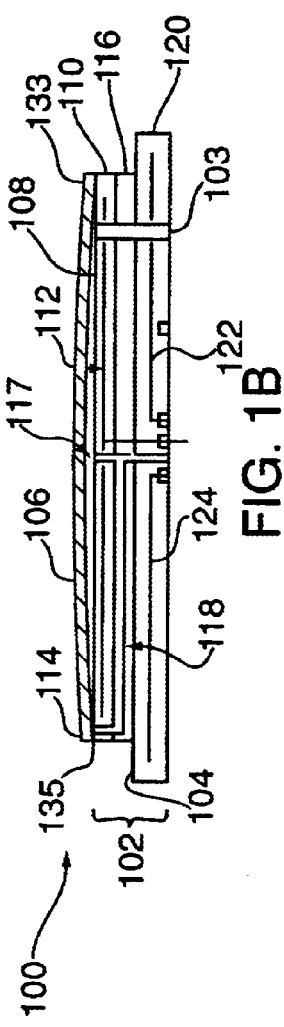
FIG. 1A
FIG. 1B

MULTI-LAYER CERAMIC ELECTROSTATIC CHUCK WITH INTEGRATED CHANNEL

BACKGROUND OF THE DISCLOSURE

1. Field of the Invention

The invention relates to semiconductor processing equipment and, more particularly, the invention relates to ceramic substrate supports.

2. Description of the Background Art

Susceptors are widely used to retain substrates, such as semiconductor wafers, within semiconductor wafer processing systems during processing. The susceptor is typically mounted to a pedestal. The pedestal is typically fabricated from a metal such as aluminum. The susceptor may be fabricated from laminated sheets of a polymer. However, for high temperature applications, the susceptor is typically fabricated from a ceramic material such as aluminum oxide or aluminum nitride. The susceptor typically contains various components which provide heating and/or cooling of the wafer as well as clamping (chucking) of the wafer to retain the wafer in a stationary position upon the pedestal surface. The pedestal may also include one or more electrodes for applying a bias voltage to the wafer. Such a bias voltage may be a direct current (DC) bias or a radio frequency (RF) bias.

Electrostatic susceptors (or chucks) retain a substrate by creating an electrostatic attractive force between the workpiece and the chuck. A voltage applied to one or more electrodes in the chuck so induces opposite polarity charges in the workpiece and electrodes. The opposite charges pull the workpiece against the chuck, thereby retaining the workpiece. These chucks find use in different types of wafer processing including etching, chemical vapor deposition (CVD), and physical vapor deposition (PVD) applications.

More specifically, an electrostatic chuck can be either "monopolar" or "bipolar". In a "monopolar" electrostatic chuck, voltage is applied to the conductive pedestal relative to some internal chamber ground reference. Electrostatic force is established between the wafer and the chuck. In a "bipolar" electrostatic chuck, two electrodes are placed side-by-side (co-planar) to create the desired electric field. A positive voltage is applied to one electrode and a negative voltage is applied to another electrode. The opposite polarity voltages establish an electrostatic force that clamps wafer to the chuck.

The materials and processes used to process a semiconductor wafer are temperature sensitive. Should these materials be exposed to excessive temperature fluctuations due to poor heat transfer from the wafer during processing, performance of the wafer processing system may be compromised. To optimally transfer heat between the wafer and a chuck (or the chuck and the wafer), an electrostatic force is used to cause the greatest amount of wafer surface to physically contact a support surface of the chuck. However, due to surface roughness of both the wafer and the chuck, small interstitial spaces remain between the chuck and wafer that interfere with optimal heat transfer.

To promote uniform heat transfer characteristics, an inert heat transfer gas (such as Helium or Argon) is introduced beneath the wafer to fill the interstitial spaces between the wafer and the chuck surface. This gas acts as a thermal conduction medium between the wafer and the chuck that has better heat transfer characteristics than the vacuum it replaces thereby promoting uniform heat conduction across the entire bottom surface of the wafer. Such a heat transfer gas is typically provided by channels drilled vertically through the body of the chuck from the wafer support surface to the bottom of the chuck. However, when the chuck is subject to a plasma, the heat transfer gas is prone to ignition thereby generating a plasma in the gas channels. The plasma in the gas channels sputters particles from the gas channel walls. The sputtered particles enter the processing chamber and contaminate the wafer.

Techniques, such as porous plugs and narrow diameter channels, have been tried to prevent plasma ignition in the orifices by attempting to increase the plasma free path. Electrons are neutralized (quenched) upon colliding with the ceramic walls of the pores or channels. Thus, the porous plugs and narrow, high aspect ratio orifices are designed to cause the electrons to quench on their walls before encountering a gaseous (He) atom, thereby preventing plasma formation within the gas channels.

Although these techniques do inhibit plasma ignition in the channels, there are considerable disadvantages. For example, the use of porous ceramic plugs complicates the fabrication of the chuck. Furthermore, porous ceramics tend to be chalky and produce particles that contaminate wafers during processing. The narrow orifices similarly increase the plasma free path and, therefore, inhibit plasma ignition in the channels. In the range of gas pressure and electric field normally encountered in the Helium ports, the diameter of the hole should be as small as possible. However, it is extremely difficult, time consuming and expensive to manufacture a ceramic chuck with small diameter holes bored entirely through the chuck body. Holes greater than 3 mm in diameter can be drilled in ceramics relatively easily using diamond drills. Holes 0.5 mm in diameter can be drilled through 3–15 mm of ceramic, at great expense, only by ultrasonic drilling methods. Unfortunately, the plasma free hole diameter is typically about 0.2 mm. Such holes can only be drilled through a thick plate by expensive laser drilling. Since the helium flow rate depends on the overall area of the holes, many small diameter holes (hundreds) are required to feed the helium fast enough.

Therefore, a need exists in the art for an easily fabricated ceramic electrostatic chuck having a backside gas distribution structure that inhibits plasma ignition in the gas delivery channels and a concomitant method of fabricating same.

SUMMARY OF THE INVENTION

The disadvantages associated with the prior art are overcome by the present invention of a susceptor having first and second ceramic layers. The first layer has a support surface, a bottom surface, and a plurality of ports therebetween. The second ceramic layer, is disposed beneath the first ceramic layer. A plenum, formed in the second layer, distributes of a heat transfer gas to the support surface. The first and second layers are stacked such that the bottom surface of the first layer forms a roof of the plenum. The first ceramic layer made thin to facilitate formation of multiple small diameter ports that communicate between the plenum and the support surface. The plenum is also made thin so that the small size of the ports and plenum inhibits plasma ignition inside the plenum. The plenum comprises, for example, a plurality of radially extending channels and at least one peripheral groove that communicates with said radially extending channels.

The structure of the susceptor is not limited to two ceramic layers. Any number of additional ceramic layers may be disposed below the second ceramic layer. The susceptor may also include one or more electrodes disposed within at least one of the ceramic layers. Any suitable number, pattern or type of electrode may be utilized. For example, the susceptor may include chucking, heating or bias electrodes.

The susceptor of the present invention may be fabricated by an inventive method. A first ceramic layer is formed to provide a support surface, a bottom surface, and a plurality of ports. A second ceramic layer is formed to provide a plenum. The second layer is disposed beneath the first layer such that the bottom surface of the first layer forms a roof for the plenum. The ports and plenum are aligned such that the ports in the first layer communicate with the plenum. The layers are cured to form a ceramic body by co-firing or hot pressing.

The reduced thickness of the first layer makes fabrication of multiple small diameter ports faster and less expensive. The small diameter ports in the susceptor of the present invention prevent plasma ignition inside the plenum. The ports can be distributed in any way that provides heat transfer gas to where it is needed, thus ensuring uniform cooling of a wafer supported by the susceptor.

BRIEF DESCRIPTION OF THE DRAWINGS

The teachings of the present invention can be readily understood by considering the following detailed description in conjunction with the accompanying drawings, in which:

FIG. 1A depicts a top plan view of the electrostatic chuck of the present invention;

FIG. 1B depicts a vertical section of the electrostatic chuck along line 1B—1B of FIG. 1;

To facilitate understanding, identical reference numerals have been used, where possible, to designate identical elements that are common to the figures.

DETAILED DESCRIPTION

Figure 2A:
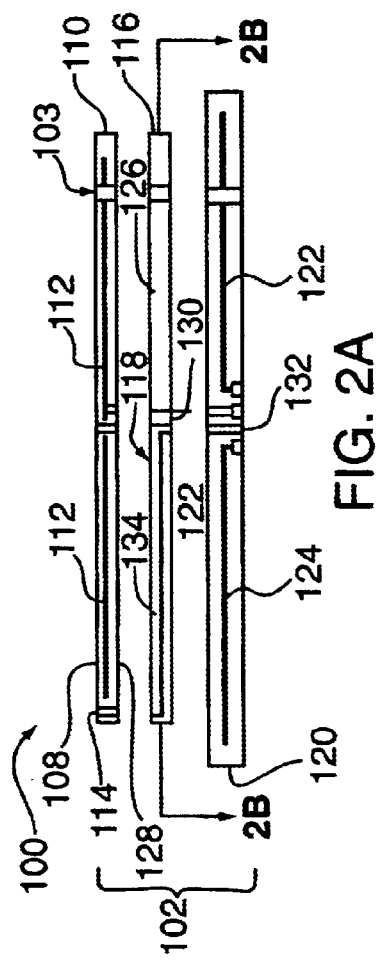
FIG. 2A depicts an exploded view of the vertical section of the electrostatic chuck of the present invention.

The electrostatic chuck 100 of the present invention is depicted in FIGS. 1A and 1B. The electrostatic chuck 100 comprises a substantially disk shaped unitary ceramic body 102.having a peripheral flange 104. The body 102 is, for example, fabricated of a material such as aluminum oxide ($Al_2O_3$ or alumina), aluminum nitride or similar material. The body 102 includes a support surface 108 for supporting a substrate, such as a semiconductor wafer 106. The support surface 108 may be flat or contoured as necessary for properly supporting the substrate. Furthermore, the support surface 108 may include grooves, channels or other contours for backside gas cooling.

FIG. 2A depicts an exploded vertical cross section of the electrostatic chuck of the present invention. The body 102 is fabricated in a plurality of layers. Specifically, the body 102 includes a first layer 110 that provides the wafer support surface 108. The first layer 110 is quite thin, typically less than 3 mm, preferably between 1 and 2.5 mm thick. One or more chuck electrodes 112 may be incorporated into the first layer 110. For example, two chuck electrodes 112 are shown in FIG. 2A and the chuck 100 is a bipolar electrostatic chuck. Alternatively the present invention may be implemented using any number of chuck electrodes 112 and any type of chucking electrode structure including monopolar, bipolar, tripolar, interdigitated, zonal and the like. The first layer 110 also includes a plurality of ports 114 for supplying heat transfer gas. The ports 114 typically have a diameter that is 20 mils (approximately 0.5 mm) or less, preferably between 0.1 and 0.5 mm. Furthermore, because the first layer 110 is quite thin, the ports 114 are quite short and, therefore, are easily formed in the first layer 110. A second layer 116, disposed beneath the first layer 110, provides a plenum 118 for heat transfer gas distribution, the details of which are discussed below. The plenum is electrically isolated from ground by the ceramic of the body 102. The ports 114 in the first layer 110 communicate with the plenum 118.

A third layer 120, disposed beneath the second layer 116, serves as a base of support for the other two layers. One or more heater electrodes 122 are disposed within the third layer 120 for heating the chuck 100 and a wafer 106 supported by the support surface 108. Any number or arrangement of heater electrodes 122 can be used including a single heater electrode 122, or two or more heater electrodes may be used for zoned heating and the like. The chuck electrodes 112 and heater electrodes 122 are preferably made of metals such as molybdenum and tungsten.

The first and second layers have substantially the same diameter. The third layer 120. generally has a larger diameter than the first and second layers and thereby provides the flange 104. The flange 104 may be used to accommodate a deposition ring, clamp ring, or similar structure. All three layers may be fabricated separately and laminated together by co-firing or formed together by hot press to form the ceramic body 102.

The ceramic body 102 also includes a plurality of lift pin holes 103 bored through all three layers to accommodate a corresponding plurality of lift pins for raising and lowering a semiconductor wafer 106. Although three layers are specifically shown and described herein, those skilled in the art will recognize that any number of layers may be used to fabricate the chuck 100. Alternatively, the chuck 100 may be fabricated without heater electrodes or fabricated as a mechanical chuck without chucking electrodes. Furthermore, the chuck 100 may also incorporate one or more bias electrodes 124 for applying radio frequency (RF) and/or direct current (DC) bias. The bias electrodes 124 are, for example, incorporated into the third layer 120. Alternatively, the bias electrodes 124 may be incorporated into the first layer 110 or a separate bottom unit to facilitate connection of the bias electrodes 124 for RF compatibility.

Figure 2B:
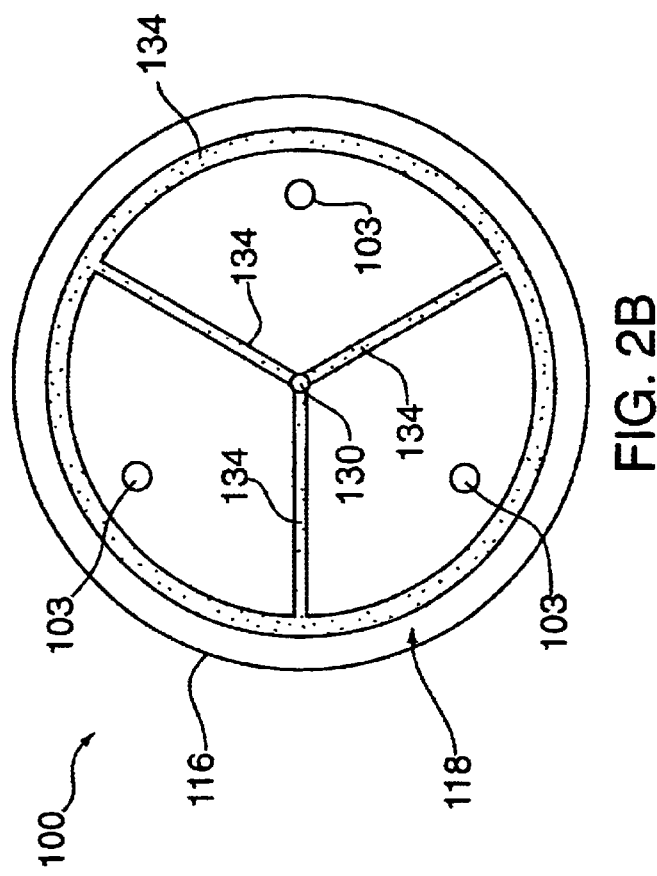
FIG. 2B depicts a horizontal section taken along lines 2B—2B of FIG. 2A.

The details of the plenum 118 in the second layer 116 are best understood by simultaneously referring to FIGS. 2A and 2B. The plenum 118 is formed by sculpting an upper surface 126 of the second layer 116 to produce a pattern of channels and/or grooves. A bottom surface 128 of the first layer 110 covers the plenum 118. Heat transfer gas enters the plenum 118 through a central inlet 130 in the second layer 116. The central inlet 130 communicates with a central bore 132 drilled vertically through the third layer 120. The central bore 132 generally has a much larger diameter than the ports 114 to facilitate delivery of gas to the plenum 118. A remote heat transfer gas source may be connected to the central bore 132 to supply heat transfer gas to the chuck 100.

Heat transfer is most efficient and the temperature across the wafer 106 is most uniform if the heat transfer gas is uniformly distributed over the support surface 108. To facilitate heat transfer, the plenum 118 comprises a plurality of radially extending channels 134 that communicate with a peripheral groove 136. Gas enters the channels 134 through the central inlet 130, travels along the channels 134 to the peripheral groove 136 and exits through the ports 114 in the first layer 110. The ports 114 in the first layer 110 are arranged in a pattern that facilitates distribution of heat transfer gas to where it is needed in order to uniformly cool the wafer 106. For example, if a center of the wafer 106 bows upward under pressure from the cooling gas, a periphery 133 of the wafer 106 (see FIG. 1B) will be more strongly adhered to the support surface 108. This is because the force of coulombic attraction between the wafer 106 and the chuck electrodes 112 decreases as the separation between them increases. As such, the heat transfer gas from the central bore 132 may not fill all the interstitial spaces between the periphery 133 of the wafer 106 and the support surface 108. To uniformly fill these interstitial spaces, the ports 114 are uniformly distributed about a periphery 138 of the first layer 110.

The purpose of the ports 114 is to fill a space 117 space between the support surface 108 and the wafer 106 as quickly as possible, e.g. within 1–2 seconds. The combined cross sectional area of the ports 114 should be in the range of 0.02 to 0.1 sq. cm. The number of ports 114 depends on the hole size. For example, 0.05 sq. cm. equals approximately 24 ports, each of 0.5 mm diameter. Since the cross sectional area is proportional to the square of the diameter of the hole, 25 times as many 0.1 mm diameter holes as 0.5 mm diameter ports are required to provide the same cross sectional area. Once the space 117 is filled with Helium, further flow of helium is required only to replace Helium that leaks out through a less than perfect seal 135 between the wafer and the support surface 108. Hence it is desirable to place the ports 114 as close to the edge the chuck 100 as possible while remaining radially inward of the seal 135. The seal 135 is generally in the shape of a band 1 to 3 mm in width. The ports 114 are uniformly distributed along a circumference that lies between approximately 1 and 5 mm radially inward of the inner edge of the seal band.

Although three channels 134 are depicted in FIG. 2B, any number of channels 134 may be formed in the second layer 116. Similarly, although a single peripheral groove 136 is depicted in FIG. 2B, any number of concentric grooves may be formed in the second layer 116. The channels 134 and groove 136 should be shallow in depth in order to provide a narrow gap that inhibits plasma ignition in the plenum 118. The channels are between approximately 5 to 100 microns in depth and 25 microns or more in width. At depths smaller than 5 microns, the helium conductance in the channels is too low. At very large depths, wafer 106 is so much above the electrodes 112 that the chucking force is too low. Preferably, the channels 134 and groove 136 are approximately 50 microns deep. At such a depth, heat transfer gas cannot ignite in the central bore 132 because electrons are likely to collide with the ceramic wall of the channels 134 before encountering a Helium atom.

Figure 3:
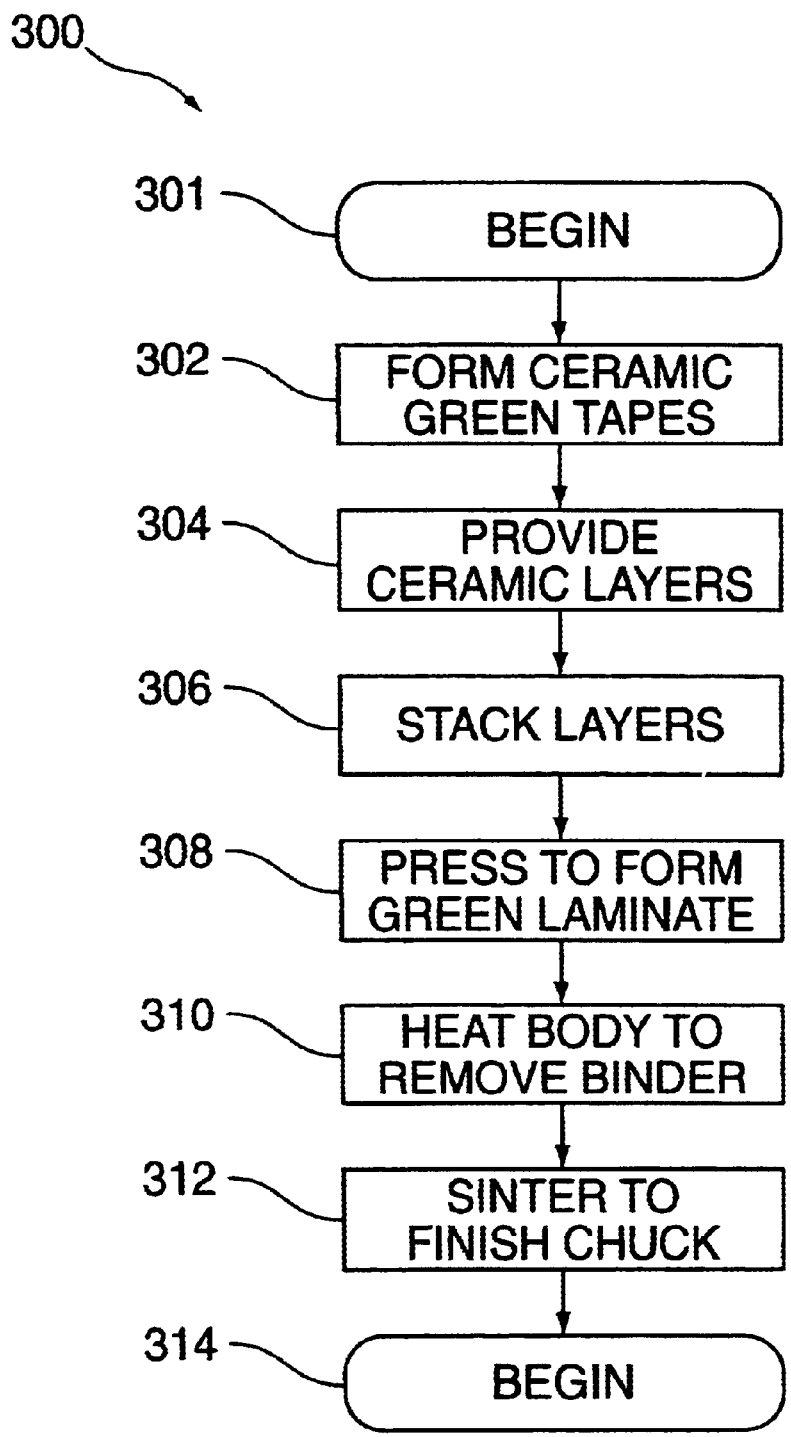
FIG. 3 depicts a flow diagram of the method of fabricating the chuck of the present invention.

The chuck 100 of the present invention may be manufactured according to an inventive method. FIG. 3 depicts a flow diagram of the method of the present invention. FIGS. 4a–4d depict the chuck 100 at various stages of fabrication. The method 300 begins at step 301. In step 302 a plurality of unfired ceramic green tapes 410a, 410b, 416, 420a and 420b are formed. The green tapes are made from a powdered ceramic such as aluminum nitride or aluminum oxide mixed with an organic binder such as artificial rubber (butadiene) or poly-methyl methacrylate (PMMA) and cast into sheets and sized by means known in the art. In step 304 the green tapes are sized and shaped to provide a plurality of ceramic layers such as layers 410, 416 and 420 depicted in FIG. 4b. For example, holes 408 are punched into selected green tapes for feed throughs 428, central bore 132 and gas ports 114 etc. Holes having diameters of 0.2 to 0.5 mm (such as ports 114) can be punched in the green tape layers using a special punch and dies as is routinely done in the multilayer ceramic art. The feed through holes 408 are filled with a tungsten or molybdenum powder 418.

Figure 4A:
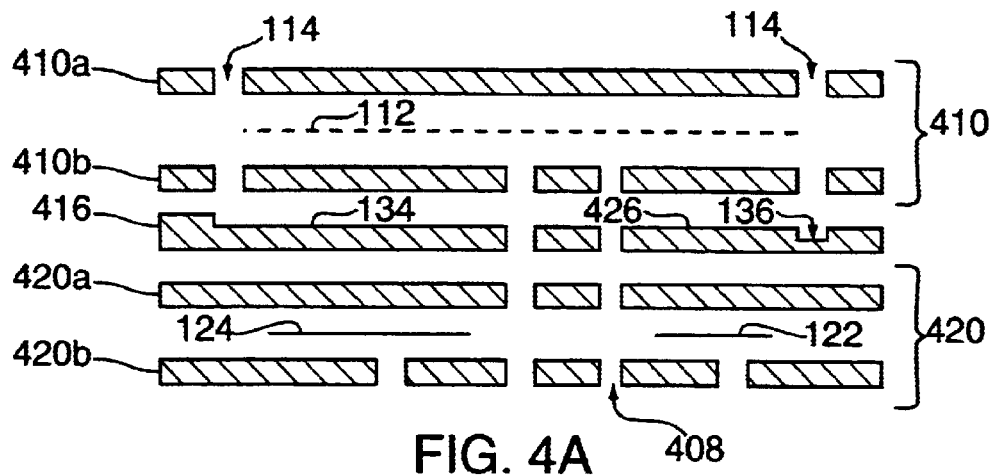
FIGS. 4a–4d depict cross sectional views of an electrostatic chuck at different stages of fabrication according to the method of the present invention.
Figure 4B:
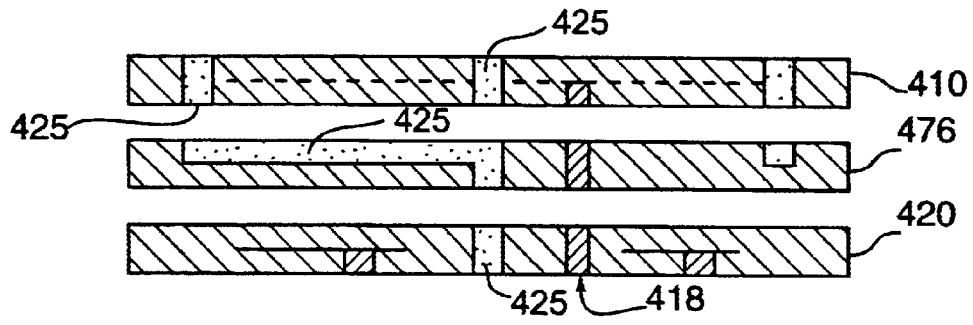
Figure 4C:
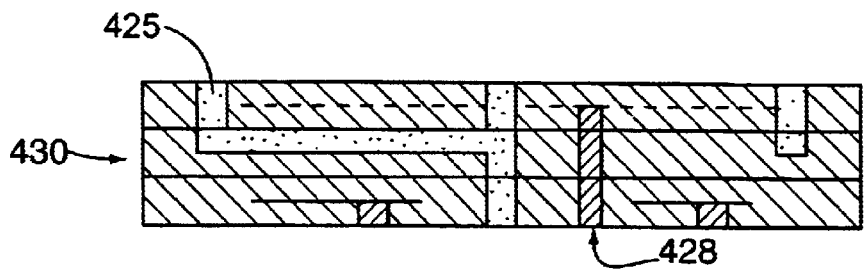

Electrodes 112, 122, 124 are then provided on selected green tapes. For example, the electrodes are screen printed using the tungsten/molybdenum paste 418. Specifically, one or more chuck electrodes 112 are screen printed on green tape 410a of layer 410, heater electrodes 122 and bias electrodes 124 are screen printed on green tape 420a of layer 420. Often two or more green tapes are laminated together first to form layers in order to obtain the desired thickness of the layer or to embed the electrodes. For example, the green tapes 410a and 410b are laminated together to form the layer 410 as shown in FIG. 4b. Similarly layer 420 is formed from green tapes 420a and 420b. The layers 410 416 and 420 are stacked together on top of one another in step 306 and laminated by pressing in a platen press in step 310 to produce a green laminate 430 as shown in FIG. 4c. The holes in the individual green tapes are lined up in a special aligning fixture before laminating the tapes together in a hot press under moderate temperatures and pressures (about 100° C. and between about 100 to 1000 pounds per square inch). Under these conditions, the semi-plastic green tapes deform and fuse to give one thick monolithic green body layer. The same deformation also tends to close up the holes 408. To prevent this, the punched holes 408 in the individual green tape layers are filled with a paste 425 of a colored polymer powder such as poly methyl methacrylate (PMMA) using a screen printing method prior to lamination. Similarly the plenum 118 (i.e. channel 134 and groove 136) are filled with filler paste 425 to prevent these structures from collapsing during lamination.

Figure 4D:
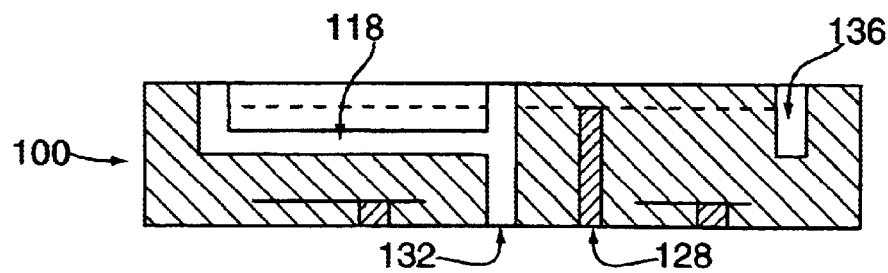

The green laminate is then heated in a furnace to remove the organic binder in step 310. This step is performed at a temperature between 300° and 1000° C. The filler paste 425 filling the holes 408, plenum 134 and groove 136 carbonizes, becomes carbon monoxide and is removed. The removal of the filler paste 425 from the ports 114, channels 134 and groove 136 leaves behind clean holes and channels in the structure as shown in FIG. 4d. Next, in step 312, the laminate is sintered in reducing ambients such as hydrogen or nitrogen with controlled oxygen partial pressure at temperatures between 1500° to 2100° C. to consolidate the ceramic. Concurrently, the metal powder 418 consolidates to form a completed feed through 428. The oxygen partial pressure of the furnace ambient is controlled through mixing of hydrogen or nitrogen with water vapor. The small amounts of oxygen are intended to remove the carbon residues from the binder during step 310 and to keep the Aluminum Nitride, Alumina or other ceramic from being reduced by the reducing ambient in step 312. After sintering is completed, the method ends at step 314.

The above sequence can be followed through sintering (step 312) for each of the chuck layers 410, 416, 420 separately. The sintered layers 410, 416, 420 are then joined together in one or more steps to form the enclosed plenum 118. This requires that the plenum 118 (i.e. channels 134 and groove 136) be machined or formed in an upper surface 426 of layer 416 before the layers 410, 416 and 420 are joined together. The joining can be accomplished by reheating the stacking the sintered layers together and then reheating them together to the original sintering temperature to cause ceramic to ceramic diffusion bonding. This is expensive and requires special measures to avoid collapsing the plenum 118 and ports 114. Alternatively, the layers 410, 416, and 420 can be joined together using another ceramic or class having a lower fusion temperature than the ceramic of the layers.

In a preferred embodiment, the layers 410, 416, and 420 are formed separately through lamination in step 308. The channel 134 and groove 136 are then machined into the soft laminate of the layer 416 to form the plenum 118. Alternatively, the plenum 118 can be embossed into the surface 426 of the layer 416 during step 310 using an embossing die having the corresponding pattern in its surface. The green tape (or tapes) forming the layer 416 plastically deforms to give the imprint of the die in its surface. In either case, the plenum 118 is filled with retaining filler paste 425. After this, the layers 410, 416 and 420 are laminated together in the same press and then sintered together to form the chuck body 102 as described with respect to step 312.

The resulting chuck 100 exhibits superior distribution of heat transfer gas to backside of the wafer 106. Uniform distribution of heat transfer gas leads to more uniform cooling of the wafer 106 and, hence, more uniform wafer processing. In addition, the small diameter of the ports 114 inhibits the ignition of plasma in the plenum and consequent contamination of the wafer. As a result, fewer wafers are defective, productivity is higher, cost per wafer is lower and profitability is increased. Furthermore, the plenum 118 for gas distribution obviates the need to drill holes through the bulk of the chuck body 102. Consequently, a greater number of holes can be drilled with smaller diameters that previously practical. As such, the chuck 100 is more easily fabricated in less time and with lower cost than prior art chucks.

Although the fabrication of the chuck has been described in terms of separately laminating (pressing) and sintering the layers that make up the chuck, this does not preclude a fabrication method that combines pressing with sintering. For example, the chuck 100 could be formed by cold pressing green sheets of ceramic with small amounts of binder to form green tapes 410a, 410b, 416, 420a and 420b. Next electrodes are sandwiched between selected layers and repressed to form a composite green body layer. For example, a wire mesh or plate of molybdenum etched with numerous holes is sandwiched between layers 410a and 410b to embed the electrode 112 in layer 410. The composite green body layer 410 is then transferred to an inductively heated graphite mold in a hot press where it is heated in a nitrogen or reducing gas to over 1800° C. to sinter the ceramic powder. The layers 416 and 420 are similarly formed and sintered. All three sintered layers 410, 416 and 420 are then machined to final dimensions. The required helium ports 114 are drilled in sintered layer 410 by either diamond or ultrasonic drilling. The helium channels are machined into the surface of sintered layer 416. The three sintered layers are then aligned together and heated (at very low or no applied pressure) close to the sintering temperature to cause diffusion bonding at the mating surfaces of the layers. Such bonding is generally facilitated by incorporating a thin, unsintered (or green) ceramic layer between the sintered layers.

Although various embodiments which incorporate the teachings of the present invention have been shown and described in detail herein, those skilled in the art can readily devise many other varied embodiments that still incorporate these teachings.

What is claimed is:

1. Apparatus for supporting a substrate in a processing chamber, comprising:
   a first ceramic layer having a support surface, a bottom surface, and a plurality of ports;
   a second ceramic layer, disposed beneath said first layer, the second layer having a centrally disposed inlet and a plenum extending radially and longitudinally outward from the centrally disposed inlet formed therein, said plurality of ports are in fluid communication with the plenum and both the plurality of ports and plenum sized to inhibit plasma ignition inside the plenum, and
   a third ceramic layer disposed beneath the second ceramic layer having a central bore communicating with said centrally disposed inlet.

2. The apparatus of claim 1 wherein said first and second layers are stacked such that said bottom surface forms a roof of said plenum.

3. The apparatus of claim 1 wherein said first layer is less than approximately 3 mm thick.

4. The apparatus set forth in claim 1, wherein said ports have a diameter of less than approximately 0.5 mm.

5. The apparatus of claim 1 wherein said plenum comprises a plurality of channels.

6. The apparatus of claim 5 wherein said plurality of channels comprises three channels radially extending from a central inlet in the second layer.

7. The apparatus of claim 6 wherein said plenum further comprises at least one peripheral groove that communicates with said radially extending channels.

8. The apparatus of claim 5 wherein each channel of said plurality of channels has a depth of between approximately 5 to 100 microns.

9. The apparatus of claim 8 wherein each channel of said plurality of channels has a width of approximately 25 microns or more.

10. The apparatus of claim 1 further comprising one or more electrodes disposed within at least one of said first and second layers.

11. The apparatus of claim 10 wherein said one or more electrodes comprises at least one chucking electrode.

12. The apparatus of claim 10 wherein said one or more electrodes comprises at least one heater electrode.

13. A method of fabricating an apparatus for supporting a substrate in a processing chamber, said apparatus having a first ceramic layer, a second ceramic layer having a plenum therein, and a third ceramic layer said method comprising the steps of:
   providing said first ceramic layer having a support surface and a bottom surface;
   forming a plurality of ports in said first ceramic layer;
   providing said second ceramic layer;
   forming a central inlet and a radially extending plenum from said inlet in said second ceramic layer;
   disposing said second ceramic layer beneath said first ceramic layer; said ports in fluid communication with said plenum and both the ports and plenum are sized to inhibit plasma ignition inside the plenum providing said third ceramic layer; and
   disposing said third ceramic layer beneath said second ceramic layer.

14. The method of claim 13 wherein said plurality of ports is formed by punching a plurality of holes in said first layer.

15. The method of claim 14 wherein said holes are filled with a filler paste.

16. The method of claim 15 further comprising the step of laminating said first and second layers together.

17. The method of claim 13 wherein said plenum is formed by machining an upper surface of second layer.

18. Apparatus for supporting a substrate in a processing chamber, comprising:

a first ceramic layer having a support surface, a bottom surface, and a plurality of ports, wherein said first ceramic layer is less than approximately 3 mm thick;

a second ceramic layer, disposed beneath said first ceramic layer, having a plenum formed therein, wherein said plenum comprises a plurality of radially extending channels that communicate with a peripheral groove wherein said bottom surface forms a roof of said plenum and said plurality of ports communicate through said first layer between said support surface and said bottom surface with said plenum, said ports and plenum being sized to inhibit plasma ignition inside the plenum; and a third ceramic layer disposed beneath said second layer, said third layer having at least one electrode.

19. The apparatus of claim 18 wherein said plenum has a depth of between approximately 5 to 100 microns.

* * * * *